April 19, 1960 W. J. POPPELBAUM 2,933,621
TRANSISTOR FLIP-FLOP CIRCUIT
Filed Aug. 2, 1956
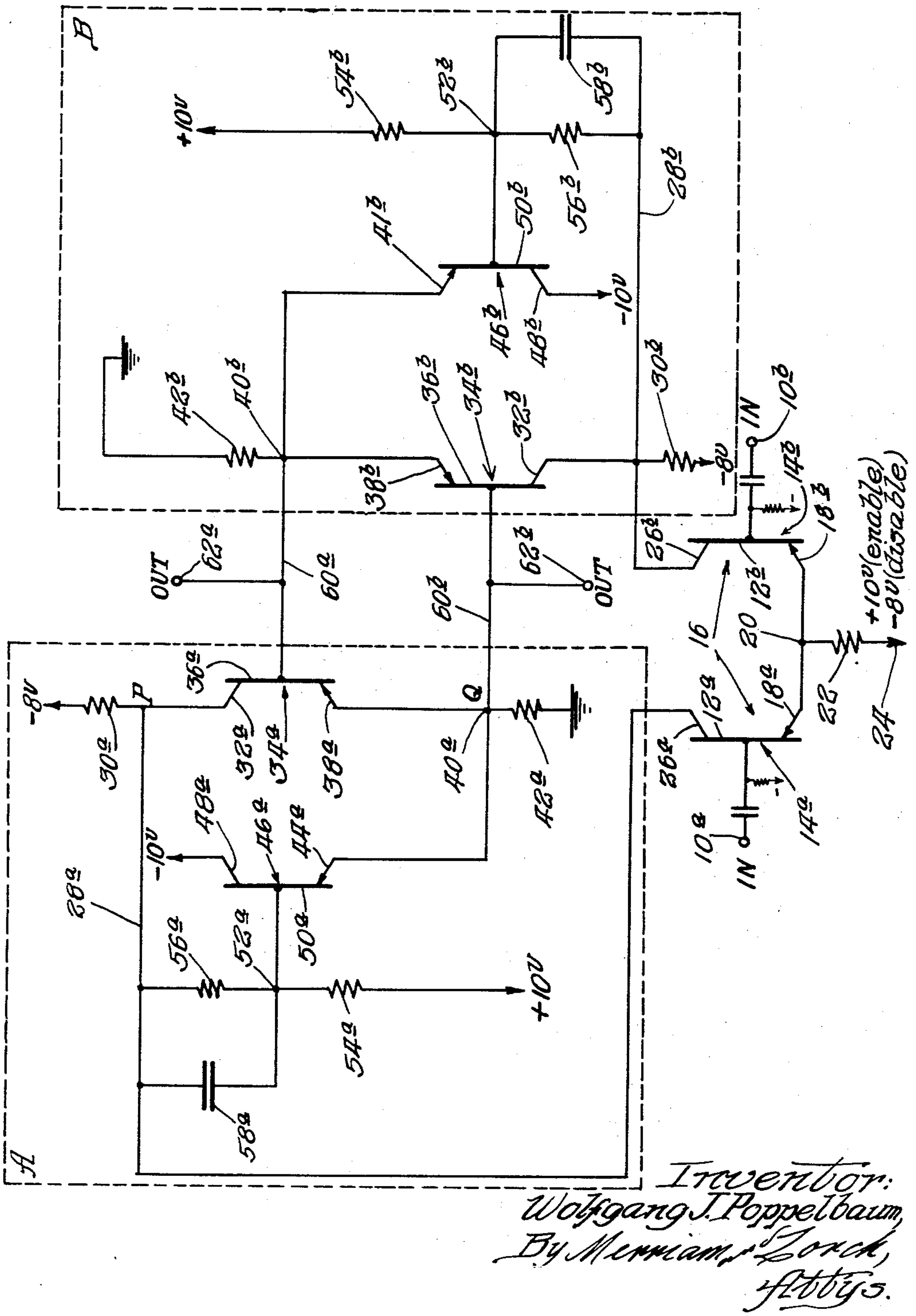
Inventor:
Wolfgang J. Poppelbaum,
By Merriam, Lorch,
Attys.

United States Patent Office 2,933,621

Patented Apr. 19, 1960

2,933,621

TRANSISTOR FLIP-FLOP CIRCUIT

Wolfgang J. Poppelbaum, Champaign, Ill., assignor to University of Illinois Foundation Application August 2, 1956, Serial No. 601,707

6 Claims. (Cl. 307—88.5)

This invention is concerned generally with the electronic arts, and more particularly with a transistor cross-coupled flip-flop circuit, particularly for use in digital computers.

As is known in the art of digital computers, coupled flip-flop circuits which have two stable conditions, and an intermediate unstable condition, are used to compute and indicate coded intelligence. In a racing register, i.e., a combination of two flip-flops, the first one setting the second, which in turn sets the first one back again, the succeeding stage is triggered when the flip-flop has gone through fifty percent of its swing, through the intermediary of a "gate" in the nature of a difference amplifier. Obviously, the faster the circuit can change its state, and trigger the succeeding circuit, the faster the computer can work. The fastest tube circuits generally operate no faster than on the order of 50 mμs. (50 millimicroseconds or $50 \times 10^{-9}$ seconds).

It is an object of this invention to provide a transistor flip-flop circuit operable at substantially higher speeds than any flip-flop circuits heretofore known.

More particularly, it is an object of this invention to provide a flip-flop composed of a pair of bistable circuits coupled to and controlling one another, each of the bistable circuits comprising a grounded-base-amplifier controlled by and working into an emitter-follower.

More specifically, it is an object of this invention to provide a transistor flop-flop circuit utilizing emitter-base cross-coupling.

Other and further objects and advantages of the present invention will be apparent from the following description when taken in conjunction with the accompanying drawing wherein the single figure comprises a schematic wiring diagram of the invention.

The circuit now to be described is generally symmetrical, and for purposes of clarity the symmetrical parts will be identified by similar numerals, those on one side of the circuit having the suffix *a*, and those on the other side of the circuit having the suffix *b*. As is common in circuits of this nature, there are two input connections respectively numbered 10*a* and 10*b*. The input connections are directly connected to the bases 12*a* and 12*b* of a pair of transistors 14*a* and 14*b* forming a gate 16. The emitters 18*a* and 18*b* are connected in common to a junction 20 which is connected through a resistor 22 to an external connection indicated by the arrowhead 24. The resistor 22 preferably is of 2000 ohms, and the external connection represented by the arrowhead 24 is supplied either with plus ten volts, or minus eight volts, respectively to enable or to disable the gate 16, so as to render the circuit operative or inoperative in the computer or other device in which it is incorporated. The collectors 26*a* and 26*b* of the transistors 14*a* and 14*b* are respectively connected to common wires or buses 28*a* and 28*b*.

Each of the individual flip-flop circuits including the buses 28*a* and 28*b*, and the parts hereinafter to be set forth is shown as enclosed within a dotted line box, the former being identified by the letter A and the latter by the letter B. Only the parts within the box A will be described, it being understood that the parts and connections thereof in the box B are identical, as readily can be seen by the use of similar reference numerals, except for the difference in suffixes.

The bus 28*a* is connected through a resistor 30*a* to a fixed D.-C. voltage source of —8 volts. The resistor 30*a* in this particular circuit, by way of example, has a value of 680 ohms. The bus 28*a* is connected to the collector 32*a* of a transistor 34*a*. This transistor, like all of the transistors in the circuit, is a pnp transistor. All pnp transistors could be npn transistors if the polarities of all voltages are reversed. The base of the transistor 34*a* is identified by the numeral 36*a*, and the connections thereof will be set forth hereinafter. The emitter 38*a* is connected to a junction point 40*a*, and this junction point is grounded through a resistor 42*a*. The junction point 40*a* further is connected to the emitter 44*a* of a transistor 46*a*. The collector 48*a* of the transistor 46*a* is connected to a fixed D.-C. potential source of —10 volts. The base 50*a* of the transistor 46*a* is connected to a junction point 52*a*.

The junction point 52*a* is connected through a resistor 54*a* to a fixed source of D.-C. potential of +10 volts. In the illustrative example, the resistor 54*a* is of 4700 ohms. The junction 52*a* further is connected through a resistor 56*a* to the bus 28*a*, and a capacitor 58*a* is in parallel with the resistor 56*a* between the junction 52*a* and the bus 28*a*. In the illustrative example of the invention, the resistor 56*a* has a value of 1200 ohms, forming with the resistor 54*a* a voltage divider, and the capacitor has a value of .001 microfarad.

It previously has been noted that the connections of the base 36*a* of the transistor 34*a* would be set forth at a later time. The connection is of extreme importance, and it will be noted that a wire 60*a* leads from the base 36*a* to the junction point 40*b*, whereby the base 36*a* is coupled to the emitter 38*b*. Similarly, the wire 60*b* couples the base 36*b* to the emitter 38*a*. The wire 60*a* is provided with an output connection 62*a* (the wire 60*b* similarly being provided with an output connection 62*b*).

Consider now only the circuit arrangement shown within the box A. The transistor 34*a* acts essentially as a grounded base amplifier, while the transistor 46*a* acts as an emitter-follower. The connection of the two comprises a bistable circuit. The bistable nature of the circuit readily can be understood from the following reasoning: Suppose that 32*a* starts conducting, i.e., that the base-collector current increases. The point P thus will become more positive, and this voltage change will be transmitted to the base 50*a* of the transistor 46*a* through the divider network including the resistor 56*a* and the capacitor 58*a*. Transistor 46*a* acts as an emitter-follower, increasing the potential of Q, and therefore producing still more current in transistor 36*a*. This "race" only stops when P becomes so positive that transistor 46*a* cuts off. Similarly, if the current of the transistor 34*a* decreases, all of the effects are opposite to those just described, and the "race" only stops when transistor 34*a* is cut off. The circuit will be stable in either of these two states, but not at any intermediate point. Thus, when transistor 34*a* is on, it means that transistor 46*a* is off, and vice versa. The transistors 34*b* and 46*b* form a separate flip-flop similar to that just described.

Now consider the bases 36*a* and 36*b* of the transistors 34*a* and 34*b*. The base 36*a* is cross-coupled to the emitter 38*b*, as is the base 36*b* to the emitter 38*a*. Accordingly, if transistor 34*a* is on, then the transistor 34*b* is off. However, the potential difference between the bases is very small because of the small and nearly constant emitter-base voltage drop in a transistor. Furthermore, it is easy to see that transistor **34*a* and transistor 46*b* (or transistor 46*a* and transistor 34*b*) are on or off together. Thus, under all circumstances, one of the base leads of 34*a* and 34*b* is held at a fixed potential by the corresponding emitter follower 46*a* or 46*b*. From this, and from the fact that the voltage between the bases 36*a* and 36*b* is negligible, it follows that the base 36*a*, for example, is at a very nearly constant potential, i.e., transistor 38*a* acts like a grounded base or GB-amplifier. Thus, the complete circuit including the parts within the boxes A and B is essentially formed of two independent bistable parts "cross-coupled" in such a way that the states thereof are always opposite. It is to be noted that the voltage divider comprising the resistor 54*a* and the resistor 56*a* is calculated in such a way that the emitter-follower 46*a* always cuts off before the amplifying transistor 34*a*** is saturated. Thus, the undesirable state of paralyzation of a transistor when it becomes saturated is avoided without the necessity of the diode limiting frequency resorted to in order to prevent such saturation.

The circuit has two stable states, as will be obvious from the foregoing discussion. For the circuit values noted, one of these states corresponds to an output voltage of —2.8 volts at output point **62*a*, and —3.6 volts at output point 62*b*. In the other stable state the output voltages are reversed. Either or both of the two output terminals can be used to furnish information about which state the flip-flop is in to another circuit. The two transistors 14*a* and 14*b* forming the gate 16 may be used to change the flip-flop from one state to another if voltages on the input terminals 10*a* and 10*b*** of —2.8 volts and —3.6 volts respectively, or vice versa, are applied thereto.

The circuit including the gate has been used in a racing register (i.e. a combination of two flip-flops, the first one setting the second, which in turn sets the first one back again). The next stage is triggered when the flip-flop has gone through fifty percent of its swing, as can be seen from the fact that the gate is a difference amplifier. The time taken to reach the fifty percent point turned out to be on the order of 20 mμs. This is believed to be substantially less than any other circuit heretofore known in the art. It will be noted that the fast operation in part is brought about by the fact that the trigger signal from the collector side of **34*a* or 34*b* is able to reach the emitter thereof by a short capacitive path. This path is formed by the .005 microfarad capacitor (58*a* or 58*b*) and the large intrinsic emitter-base capacitance of the conducting emitter-follower 46*a* or 46*b***. Accordingly, the setting of such a "cross-coupled" flip-flop takes a very short time.

It will be apparent from the foregoing that a flip-flop circuit of superior speed characteristics has been provided. Other advantages are provided by the transistors. The smaller physical size makes shorter leads possible than with tube circuits, and stray capacitances thus will be lower. Advantages will be seen in the lower power consumption of the transistors, particularly in connection with cooling problems. Furthermore, the life expectancy of the transistors is much higher than that of tubes.

Various circuit values have been given by way of specific example, and it has been noted that the transistors are of the pnp type, although npn type may be employed. Specifically, and by way of example, the transistors used are Philco SB100. The specific example of the invention, as well as the specific circuit values and transistor types, will be understood as being by way of illustration only. Various changes will no doubt occur to those skilled in the art, and are to be understood as forming a part of the invention insofar as they fall within the spirit and scope of the appended claims.

The invention is claimed as follows:

1. A flip-flop circuit comprising a pair of similar bistable circuits, each circuit includng two transistors and each circuit comprising a direct-current-coupled in-phase amplifier connected to and supplying an emitter-follower and crosswise inter-connections between the emitters and bases of the voltage in-phase amplifiers, input means to supply control signals to said bistable circuits to reverse the states of conduction and non-conduction in the said circuits, and output terminals to derive output voltages from said bistable circuits.

2. The circuit claimed in claim 1 comprising, in addition, parallelly connected capacitor and resistor means connected between the collector element of each voltage-in-phase amplifier and the base of the thereto connected emitter-follower.

3. The flip-flop circuit claimed in claim 2 wherein the input comprises a gating amplifier including a pair of transistors, and means to bias the emitters of the transistors selectively to produce conduction and non-conduction.

4. The flip-flop circuit claimed in claim 3 comprising, in addition, a connection to the base of each of the pair of transistors of the gating amplifier for controlling the conduction and non-conduction thereof and a connection between the collector elements of each of the transistors of the difference amplifier and the collector electrodes of the in-phase amplifiers of the flip-flop.

5. The flip-flop circuit claimed in claim 4 comprising, in addition, a connection between the base of one of the transistors of the first bistable circuit and the emitter of the corresponding transistor in the second bistable circuit, and a similar connection between the base of the other of the transistors of the second bistable circuit and the emitter of the corresponding transistor of the first bistable circuit.

6. A flip-flop circuit comprising a pair of similar bistable circuits each including two transistors, one transistor of each circuit being a grounded base amplifier and the other transistor of each circuit being an emitter-follower, each bistable circuit having normally two stable states and a non-stable state of transition between the two stable states, the transistors normally being in one of the two stable states, a connection between the base of each grounded base amplifier-transistor and the emitter of the other transistor of the other bistable circuit so that the grounded-base amplifier transistors are in relative opposite states of conduction and non-conduction, a difference amplifier, means to connect the difference amplifier to supply its output to control the conductive states in one bistable circuit while concurrently controlling the non-conductive state in the other bistable circuit, input means to supply control voltages to the difference amplifier so that the output changes produce reversals in the states of conduction and non-conduction in the bistable circuits, and output means connected to each flip-flop circuit.

References Cited in the file of this patent

UNITED STATES PATENTS 2,773,200 Guggi ---------------- Dec. 4, 1956

FOREIGN PATENTS 930,875 Germany -------------- July 25, 1955

OTHER REFERENCES

Pub. III, Junction-Transistor Trigger Circuits, by Flood, in Wireless Engineer, May 1955, pp. 122–130.

Electronics, June 1955, pp. 132–136.

Electronics for August 1955, pp. 112 and 113.